United States Patent [19]

Dautriche

[11] Patent Number: 5,446,283
[45] Date of Patent: Aug. 29, 1995

[54] THERMAL IMAGE DETECTOR PROVIDED WITH MEANS TO ELIMINATE FIXED PATTERN NOISE

[75] Inventor: Pierre Dautriche, Claix, France

[73] Assignee: Thomson-CSF Semiconducteurs Specifiques, Paris, France

[21] Appl. No.: 164,577

[22] Filed: Dec. 10, 1993

[30] Foreign Application Priority Data

Dec. 22, 1992 [FR] France .................. 92 15479

[51] Int. Cl.⁶ .............................................. G01J 5/10
[52] U.S. Cl. .................................... 250/332; 250/330; 250/338.3; 250/351
[58] Field of Search ............... 250/351, 338.3, 332, 250/330

[56] References Cited

U.S. PATENT DOCUMENTS 4,072,863 2/1978 Roundy .
4,115,692 9/1978 Balcerak et al. .
4,866,275 9/1989 Jaeger et al. .................. 250/330

FOREIGN PATENT DOCUMENTS 2842980 4/1980 Germany .
4-14967 1/1992 Japan .

*Primary Examiner*—Constantine Hannaher
*Attorney, Agent, or Firm*—Oblon, Spivak, McClelland, Maier & Neustadt

[57] ABSTRACT

A thermal image detector and, more particularly, linear or matrix pyroelectric detectors. These detectors work differentially in successive phases of illumination and masking via a shutter that is synchronized with signal processing circuits. The detector generates differential measurement signals representing variations of pyroelectric signals recorded during a cycle comprising a masking phase and an illumination phase. To eliminate fixed pattern noise, it is proposed to make the measurements by difference between two successive cycles of masking and illumination, the order of the illumination/masking cycles being reversed between the two cycles but the measurements being made identically in both cycles. A memory records the signals during a cycle. A subtractor subtracts the signal of the current cycle from the signal recorded in the previous cycle.

12 Claims, 4 Drawing Sheets

THERMAL IMAGE DETECTOR PROVIDED WITH MEANS TO ELIMINATE FIXED PATTERN NOISE

BACKGROUND OF THE INVENTION

1. Field of the Invention

The invention relates to thermal image detectors, notably pyroelectric detectors, designed to produce an image of a scene in infrared light, and especially to detectors that work at ambient temperature.

Pyroelectric detectors work as follows: they absorb infrared radiation to heat a pyroelectric layer, namely a layer with the property of generating surface charges as a function of the temperature. The charges generated, converted into voltage, are processed to give a measurement of the intensity of infrared radiation received by the detector. There may be other types of infrared image detectors that are based on effects other than the pyroelectric effect but rely also on the heating of a layer. They are concerned by the invention which, however, shall be described solely with reference to a pyroelectric detector.

The detector may be a point detector, or it may comprise a column of pyrosensitive points to make an infrared linear image, or again it may be a matrix network of points to form a 2D image. In particular, this image may be an image of the temperature distributions of an observed scene.

There are hybrid detectors using two substrates: one substrate that fulfils the pyroelectric function and one substrate that fulfils the signal processing functions. The two substrates are bonded face to face to connect each pyrosensitive point of the first substrate to a point of the second substrate.

More recently, monolithic detectors have also been proposed. These monolithic detectors are constituted by an integrated circuit substrate covered with pyroelectric material (a pyroelectric polymer material) that can be deposited in a thin layer. The substrate bears the circuit elements needed for the processing of the pyroelectric signal that is generated.

2. Description of the Prior Art

Since the pyroelectric material produces charges proportionally to its heating, and since this heating is an integral of the intensity of radiation received, the pyroelectric detector must work differentially and not absolutely, especially if fixed scenes are to be observed. Indeed, a constant intensity of radiation, representing the luminance of a point emitting an infrared radiation, will prompt a gradual heating of the material up to a saturation value that cannot be used to deduce the intensity of the radiation received. Furthermore, an absolute measurement of temperature would depend excessively on the variations in ambient temperature of the detector and would not be sufficiently representative of the temperature distributions of the scene observed.

This is why, it is provided that the detector will be alternately illuminated, i.e. subjected to infrared radiation, and then masked. The period of the illumination/masking alternation should be sufficient to give the pyroelectric material the time to get heated during the illumination and the time to get cooled during the masking. The cycle is equal for example to 50 Hertz (10 milliseconds of illumination for 10 milliseconds of masking). What is measured then is not the mean heating but the amplitude of variation of the heating during the alternation. For, this amplitude represents the intensity received, and does so far better than the mean heating which depends on too many other parameters.

The curve of FIG. 1 shows the evolution of the temperature of the pyroelectric layer when the illumination is thus alternated. The curve is expressed directly in terms of voltage as a function of time, the voltage indicated being a fictitious voltage that represents an output signal of the detector, it being assumed that this signal is proportional to the heating of the pyroelectric material.

The temperature rises at the start of an illumination phase and tends towards a high saturation value that depends not only on the infrared intensity received but also on the heat losses of the pyroelectric layer. Then, it falls again as soon as the masking phase starts and tends also towards a low saturation value, with a speed that depends again on the thermal losses. The difference between the voltage at the end of the illumination phase and the voltage at the end of the masking phase gives a good measurement of the intensity of the infrared radiation received.

The detection consists then, broadly speaking, in measuring a sample of a signal VSH at the end of an illumination phase and a sample of a signal VSB at the end of a masking phase, and in taking the difference VSH-VSB, therefrom to deduce a value of infrared intensity received.

In many structures of pyroelectric image detectors, it is seen that, for inevitable technological reasons, the electrical image that is produced shows fixed defects known as "fixed pattern noise" or FPN. These defects take the form of an unwanted fixed image that is superimposed on the image resulting from the illumination of the scene to be observed. For example, when the detector comprises an electrical signal amplification at each image point or pixel, the amplifiers of each pixel may have different shift voltages for the different amplifiers. This is one of the causes of the appearance of fixed pattern noises. More generally, the structural imperfections of all the circuit parts that are not common but are associated individually with each pixel introduce an FPN type of noise.

The approach used to eliminate this fixed pattern noise is usually the following one: the mean darkness of several images is computed; the result is memorized pixel by pixel. Then, each time that a image is shot, a pixel-by-pixel subtraction is made, from the signal measured at a pixel, of the darkness signal memorized for this pixel. If the fixed pattern noise varies in time, then the calibration operation has to be recommenced and a new image of mean darkness has to be memorized. Or else, it is necessary to apply known corrective coefficients by modelization as a function of parameters such as the temperature, diaphragm aperture of the objective illuminating the detector etc.

These fixed defect calibration circuits are, in any case, costly in terms of integrated circuit surface area.

One aim of the invention, therefore, is to improve existing approaches to the elimination of fixed pattern noise in image detectors.

SUMMARY OF THE INVENTION

According to the invention, there is proposed a thermal image detector comprising a shutter for the alternate illuminating and masking of the detector, a means to provide, cyclically, at least one signal for the measurement of a pixel illuminated during an illumination phase and at least one signal for the measurement of a pixel masked during a masking phase, and means to use these measurement signals for the producing, by difference between the measurement signals given during a cycle, of a temperature signal representing a measurement of temperature of a pixel for this cycle, said detector comprising:

means for the producing, identically, of the measurement signals respectively during two successive cycles, each comprising at least one masking phase and one illumination phase, the order of the masking and illumination phases that give rise to these signals being reversed between two consecutive cycles, and means to substract the signals of the first cycle from those of the second cycle.

The result of the subtraction is then a signal representing the pixel temperature sought. And the fixed pattern noises are substantially eliminated by this subtraction.

In short, the measurement is made by taking the difference between two successive masking and illumination cycles, the order of the illumination/masking cycles being reversed between the two cycles but the measurements being made identically in both cycles.

Preferably, it is provided more specifically that the first cycle will comprise firstly a first active phase of illumination and then a second active phase of masking and then a third passive phase of illumination; and the second cycle will comprise firstly a first active phase of masking, then a second active phase of illumination and then a third passive phase of masking. The active phases are those that give rise to measurements. The active phases, in principle, all have the same duration. The passive phases preferably have the same duration too.

The detector may then have means to produce a first differential signal, representing the thermal emission of a pixel, during the first phase of the first cycle and a second differential signal during the second phase of the first cycle and to produce, identically, a third differential signal and fourth differential signal respectively during the first phase and the second phase of the second cycle, means to produce two result signals that are respectively the difference between the first and second differential signals and the difference between the third and fourth differential signals, and means to produce a corrected signal that is the difference between the two result signals.

The differential signals for each phase may be produced on the basis of the differences between measurement signals produced respectively at the start and at the end of each active phase.

The corrected signal gives a measurement of the temperature of a pyroelectric capacitor which itself represents the temperature or intensity of infrared emission of a point of the scene observed by the detector.

The invention can be applied very particularly but not exclusively to monolithic detectors in which the signal processing is at least partially done by charge-transfer or charge-coupled devices (CCDs). It is particularly promising in the case of detectors wherein the charges generated by pyroelectric effect are used to control the level of a potential barrier in a charge-transfer device.

BRIEF DESCRIPTION OF THE DRAWINGS

Other features and advantages of the invention will appear from the following detailed description, made with reference to the appended drawings, of which.

MORE DETAILED DESCRIPTION

The invention shall be described in detail with reference to a matrix-type monolithic pyroelectric detector in which the electrical signal processing is done by a charge-transfer device in a silicon substrate, but the invention is equally applicable to other types of infrared detectors, the only indispensable criterion being that they should function with a shutter so that they alternately raise the temperature of the sensitive layer and let it fall again.

Figure 2:
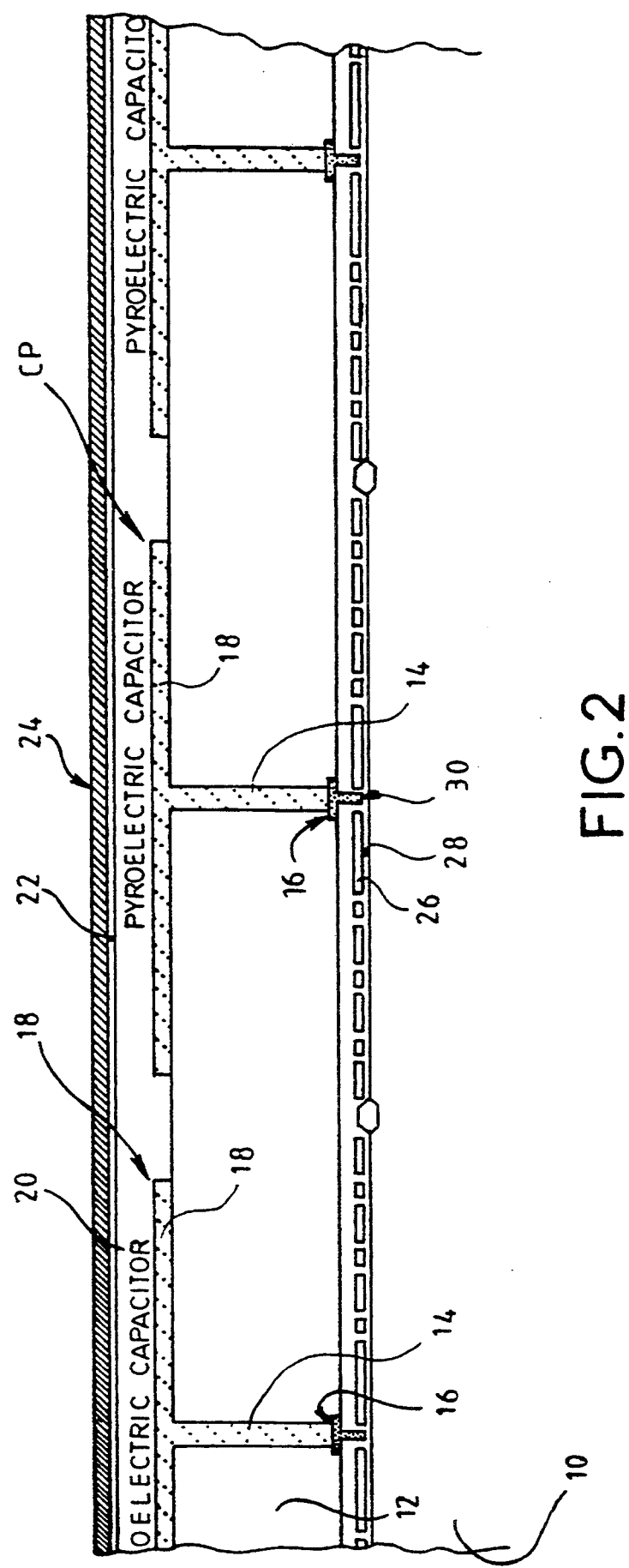
FIG. 2 shows the general structure of a monolithic pyroelectric detector comprising charge-transfer type processing devices.

Reference shall be made to the patent FR 90/15476, filed on behalf of the present Applicant, for a detailed understanding of the structure and working of a monolithic, pyroelectric matrix detector. As a rule, as shown in FIG. 2, the detector has a monolithic silicon substrate 10 in which there is formed an integrated circuit comprising essentially charge-transfer devices and the associated control circuits. The charge-transfer devices are essentially shift registers with charge transfers by parallel columns. The devices have means for the injection, into the zones or compartments of the register, of quantities of charges related to the infrared illumination to be measured, i.e. generally related to the temperature of each pixel of the infrared image observed. The control circuits are circuits that enable, firstly, the injection of charges into the registers and, secondly, the periodic shifts of packets of charges along the registers and, finally, the reading of these charges, namely the conversion of the packets of charges into voltages. The semiconductor substrate is covered with an electrical and thermal insulator 12, made of polyimide for example. This insulator is pierced locally with apertures that are filled with conductive material to constitute conductive vias 14 between the top and the bottom of the thermal insulator layer. Beneath this layer, each of the vias is in contact with a respective conductor 16 of the underlying integrated circuit. Individual rectangular electrodes 18 are deposited above the thermally insulating layer 12 in a matrix network occupying the major part of the surface of the detector. Each electrode 18 defines a pixel to be observed and it is connected to a respective conductive via 14, hence to a respective conductor 16 of the semiconductor substrate. The thermal insulator layer, thus coated with electrodes connected to the integrated circuit, is covered with a pyroelectric layer 20, preferably a layer of pyroelectric polymer material. Finally, a conductive layer 22 is deposited on the surface of the pyroelectric layer, and a layer 24 that absorbs the infrared rays in the desired range of wavelengths (generally 8 to 14 micrometers) is deposited on the conductive layer 22. The layers 22 and 24 may be one and the same layer.

Each electrode, with the portion of pyroelectric layer that covers it, defines a pyroelectric capacitor CP having an individual lower plate 18 and a collective upper plate 22. This capacitor gets charged as a function of its temperature and is connected to the underlying integrated circuit with a view to the creation, in the integrated circuit, of an electrical signal resulting from this charge.

In the exemplary embodiment shown in FIG. 2, the underlying integrated circuit is a charge-transfer circuit, and this circuit is symbolized by juxtaposed electrodes 26, generally made of polycrystalline silicon. These electrodes are insulated by a thin insulating layer 28 from the semiconductor substrate 10 in which electrical charges flow. The conductor 16, connected to a conductive via 14 of a respective capacitor, may be electrically connected to one of these electrodes, designated by 30 in FIG. 2. This electrode acts as a potential barrier of variable height for the charges that flow in the substrate, so that packets of charges can be modulated as a function of the charge of each pyroelectric capacitor. The modulated charges are transferred into shift registers that then shift these charges in parallel to the columns of capacitors of the network, i.e. in a direction perpendicular to the plane of FIG. 2.

In other embodiments of charge-transfer devices, the pyroelectric capacitors are connected directly to the substrate for a direct injection of pyroelectric charges into the semiconductor. In other embodiments that use no charge-transfer devices, the pyroelectric capacitors are connected to circuits for the direct measurement of the voltage at the terminals of these capacitors.

The detector thus made will generally be placed behind an optical element that forms an infrared image of an observed scene on the surface of the detector. A germanium lens is appropriate for wavelengths of the order of 10 micrometers. A periodically activated shutter is placed between the scene to be observed and the detector, in principle between the lens and the detector.

The absorbent layer receives the infrared radiation with an intensity that depends locally on the observed scene. It therefore gets heated locally according to a pattern of temperatures that corresponds to the observed image. The pyroelectric capacitors get heated accordingly, as a function of this image and define pixels that reproduce the pattern of temperatures of the absorbent layer with a resolution defined by the number of capacitors of the matrix network.

Each capacitor generates surface charges as a function of its own mean temperature so that, at a given instant, a given capacitor possesses a charge of its own that represents the influence, at this point and at this instant, of the infrared radiation received by the detector.

As has been explained here above, the infrared image detection makes it necessary to carry out a differential measurement between the charge resulting from the illumination and the charge in darkness. The shutter placed before the detector makes it possible to carry out this differential measurement. The shutter may be mechanical (an optical plate passing periodically before the detector, or an oscillating mirror) or electro-optical (for example a liquid crystal cell).

Figure 1:
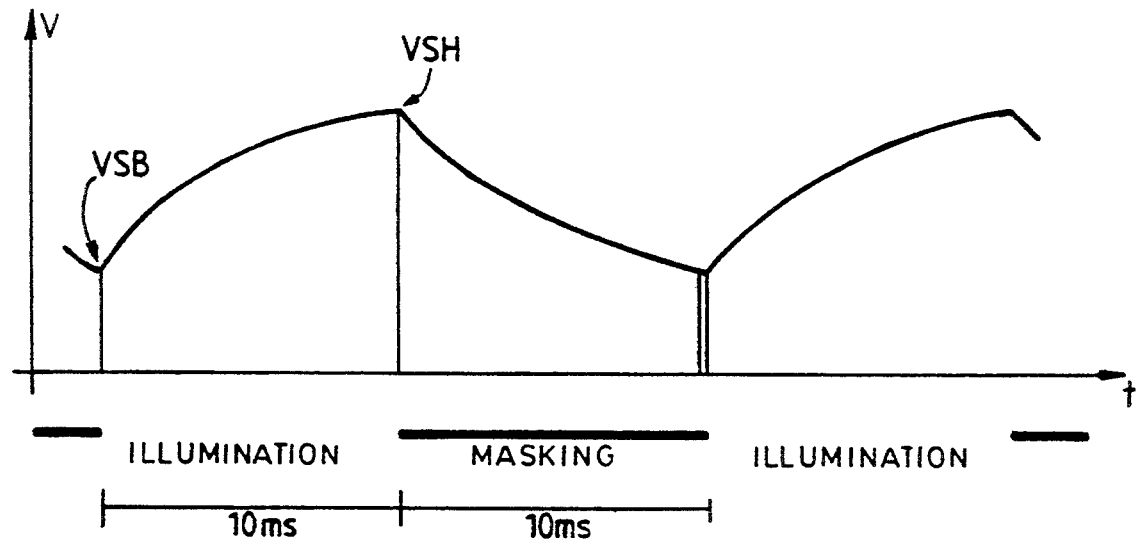
FIG. 1, already described, is a timing diagram explaining the form taken by the temperature variations generated in the pyroelectric layer of a shutter-operated detector.

It may be assumed that the pyroelectric charge generated in a pyroelectric capacitor is represented by a voltage, either because this voltage is the voltage directly measured at the terminals of a capacitor or a voltage deduced from this voltage, or because the voltage is the result of a conversion of a packet of pyroelectric charges injected by the capacitor into the substrate or again because it is the result of the conversion of a packet of charges modulated by the voltage at the terminals of the pyroelectric capacitor. In any case, the form taken by the variations of the voltage representing the pyroelectric charge is then the one explained with reference to FIG. 1.

The principle of the measurement for a pyrosensitive point then consists in determining the voltage VSB at the end of a masking phase, then the voltage VSH at the end of the illumination phase. The difference VSH-VHB is obtained. This difference is a signal representing the infrared radiation at this point. The quality of the measurement and, especially the signal-to-noise ratio, is improved by carrying out two successive measurements for one and the same masking and illumination cycle. A measurement is made of the difference in voltage generated between the start and the end of the illumination, and then of the difference between the start of the masking phase and the end of the masking phase, and then the difference between these two measurements is taken.

It will be noted that the principle remains the same when the voltage of the lower plate of the pyroelectric capacitor is reset at the end of each phase (to prevent the drifts that are caused, for example, to the thermal generation of charge carriers in a diode connected between the pyroelectric capacitor and the substrate, this diode being used for the initial polarization of the pyroelectric material: see the above-mentioned patent application No. 90 15476). In this case, the evolution of the voltage at the terminals of the pyroelectric capacitor is more likely to be the one shown in FIG. 3. The measurement of temperature at a point consists again in determining the difference in voltage generated between the start and the end of the illumination phase and, preferably, also the difference generated between the start and the end of the masking phase, and it is also possible to take the difference between these two measurements. For example, a measurement is made of the voltage VDE1 at the start of the illumination phase, just after a voltage resetting (RAZ), then of the voltage VFE1 at the end of the illumination phase. Then a resetting is done. A measurement is made of the voltage VDM2 at the start of the masking phase just after this resetting and of the voltage VFM2 at the end of the masking phase. A voltage resetting is done again, etc. The useful signal is obtained by the difference VFE1-VDE1 or VFM2-VDM2 or, better still, by (VFE1-VDE1)-(VFM2-VDM2).

According to the invention, it is proposed to improve the measurement in a way that tends to eliminate an unwanted fixed noise pattern. This noise results from the fact that the measurement is made identically for all the pixels, but through individual circuits that are not strictly identical for all the points.

According to the invention, it is proposed to make the measurement between two successive masking and illumination cycles, the order of the illumination/masking phases being reversed between the two cycles. In other words if, in a first cycle, first of all the illumination is done and then the masking, with the necessary measurements being made, then in a second cycle, immediately following the first one, first of all the masking will be done and then the illumination, and the difference of the results of the measurements of these two cycles will be taken to obtain the desired measurement of illumination.

In practice, to obtain the best results, the procedure still uses differential measurement with resetting at each phase, i.e. for each phase, the difference is measured between the level of pyroelectric charges at the start of a phase, just after a voltage resetting operation, and the level at the end of a phase, just before a resetting operation.

Figure 3:
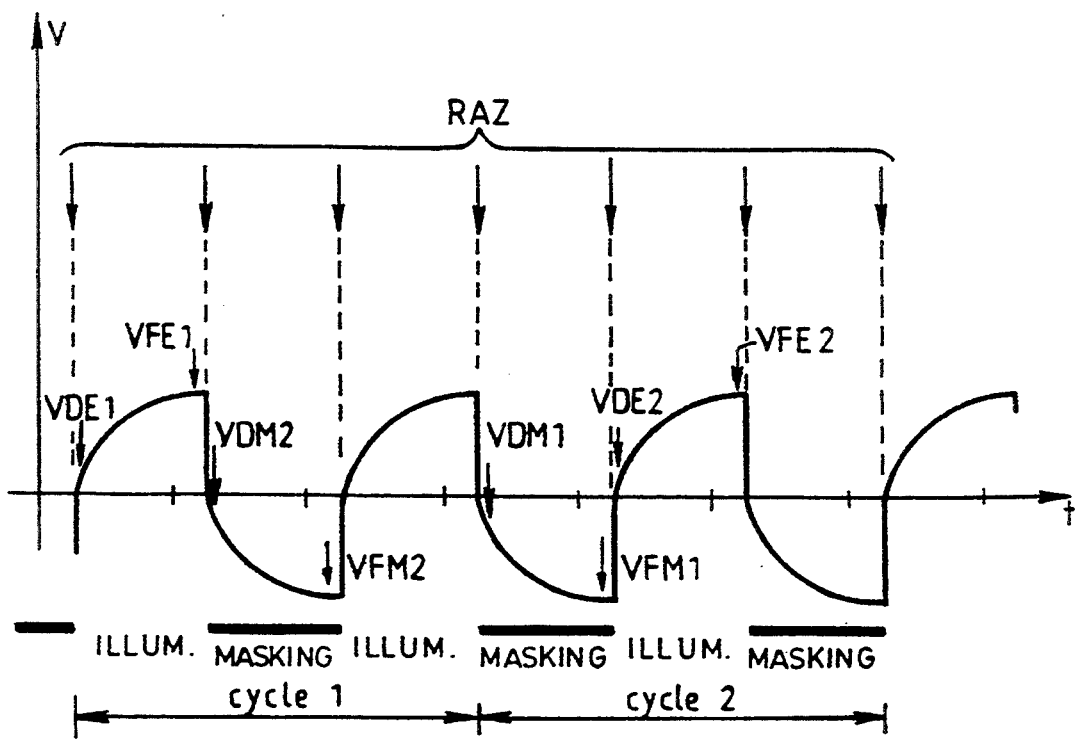
FIG. 3 shows the form of the voltage variations at the terminals of the pyroelectric capacitor in a detector according to the invention, with periodic resetting to level.

Referring to FIG. 3, there is a succession of measuring cycles that get repeated identically, but the order of the illumination and masking phases is reversed at each change of a cycle. A first cycle starts with a first phase which is an illumination phase and continues with a second phase which is a masking phase, these two phases being active phases in that measurements are made during these phases. This first cycle ends with a third phase of illumination which is a passive phase (without measurement). Preferably, all three phases have exactly the same duration (although this is not obligatory: the passive phase, in particular, could have a value that is very different from that of the others). The second cycle has a first masking phase, a second illumination phase and a third masking phase. Here again, the phases are preferably identical to one another and identical to the corresponding phases of the first cycle.

It can therefore be assumed that there is an alternation of cycles which may be called "even-order" cycles (with firstly illumination and then masking) and "odd-order" cycles (with firstly masking and then illumination).

The signal is measured at the start of the active phases, just after a voltage resetting operation, and at the end of the active phases, just before a new resetting. The interval of time between the measurement and the resetting is very small as compared with the duration of the phase: for example, a few microseconds between a measurement and a resetting for an illumination or a masking phase that lasts three microseconds.

For the two active phases of the first cycle, the following are measured:
firstly, VDE1 and VFE1 at the start and end of a first phase (illumination);
then VDM2 and VFM2 at the start and end of a second phase.

For the second cycle, the following are measured:
firstly, VDM1 and VFM1 at the start and end of a first phase (masking);
then VDE2 and VFE2 at the start and end of a second phase.

The computation circuits are "unaware" of whether the cycle is a first cycle or a second cycle, i.e. they process the signals VDM1 and VFM1 as if they were signals VDF1 and VFE1, or again they process the signals VDE1 and VFE1 as if they were signals VDM2 and VFM2. However, at a certain stage of the processing, a sign reversal may be needed for one in every two cycles: a switch-over circuit synchronized with the cycles will restore the appropriate sign.

Using the above-mentioned measuring signals, the following differential signals are set up:
a first differential signal VFE1-VDE1 representing a variation in pyroelectric charge in an illumination phase (even-order cycle);
a second differential signal VFM2-VDM2 representing a variation in charge in a masking phase (even-order cycle);
a third differential signal VFM1-VDM1 (masking phase, odd-order cycle);
and a fourth differential signal VFE2-VDE2 (illumination phase, odd-order cycle).

Each of these differences represents the temperature of the scene observed during the cycles at a given pixel or again the intensity of infrared emission at this pixel and at this instant.

The following result signals are then produced:
first result signal which is the difference between the first and second differential signals: SR1=(VFE1-VDE1)-(VFM2-VDM2);
second result signal which is the difference between the third and fourth differential signals: SR'1=(VFM1-VDM1)-(VFE2-VDE2).

And, according to the invention, the difference is taken between the second and first result signals in order to obtain a corrected signal: SC=SR'1-SR1

It will be understood that it is also possible to obtain the corrected signal SC by obtaining:
firstly, the difference (VFE1-VDE1)-(VFM1-VDM1)
then the difference (VFM2-VDM2)-(VFE2-VDE2)
and subtracting one of these results from the other.

After the corrected result SC has been obtained, the procedure passes to a following pair of even-order/odd-order cycles. Preferably, so as not to reduce the rate at which the corrected signals are obtained, the following pair of cycles uses the second cycle of the previous pair as its first cycle. Referring to FIG. 3, the processing operations are done by using, as the first cycle, the odd-order cycle in which the signals VDM1, VFM1, VDE2, VFE2 have been measured.

It will be understood that, in this case, if the same measurement and signal processing circuits are always used, independently of the fact that the pair of cycles starts with an even-order cycle or an odd-order cycle, a corrected signal will be produced with a sign that alternates at each cycle. It is therefore necessary to have a sign-reversing circuit that is activated for one in every two cycles.

The improvement in the fixed noise pattern can be explained as follows: for each pixel, an error may be introduced by the reading and processing circuits that are exclusively associated with this pixel. This noise may be expressed in the form of a systematic error voltage which therefore appears at each measurement and is constant from one cycle to another for a given pixel. The error is, for example, vd1, vf1, vd2, vf2 for the four measurements made during a cycle for a given pixel. This error is repeated at each cycle.

The corrected signal is:
SC=SR'1-SR1 with:
SR1=(VFE1+vf1-VDE1-vd1)-(VFM2+vf2-VDM2-vd2)
SR'1=(VFM1+vf1-VDM1-vd1)-(VFE2+vf2-VDE2-vd2)

The systematic errors get eliminated in the subtraction. Furthermore, the level of the signal used (SC) has been increased to an absolute value that is twice greater than SR1 or SR'2 and four times greater than the differential signals such as VDE1-VFE1. The noise, however, is not increased by the same proportion (the noise increase is rather the square root of the increase in the level of the signal, especially in charge-transfer devices). The result therefore is an improvement in the signal-to-noise ratio which is an additional advantage of the invention.

If the fixed pattern noise drifts in time (owing to variations in ambient temperature, etc.), this drift is taken into account and eliminated automatically.

Depending on the type of signal processing system used, the invention may be obtained differently.

The simplest approach consists simply in taking the output signals SR1, SR'1 obtained at each cycle exactly as they were obtained in the prior art where there was no alternation of the order of illumination. SR1 is memorized until SR'1 is obtained, and when SR'1 is obtained, the difference SR1-SR'1 is taken at the same time as SR'1 is memorized, and so on and so forth.

Figure 4:
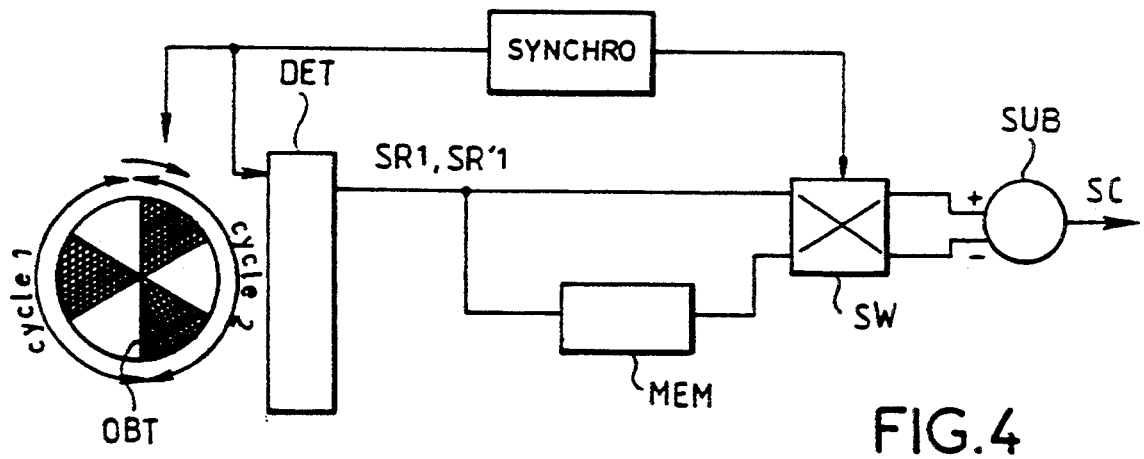
FIG. 4 shows the general architecture of the detector designed to implement the invention.

FIG. 4 shows the corresponding structure. The detector DET periodically gives the differential signals SR1 and SR'1. These signals come, for example, from an analog-digital converter forming part of the detector. The digitized signal is applied firstly to a subtractor SUB and, secondly, to a memory MEM. The subtractor receives the digitized signal and the output of the memory containing the signal SR1 or SR'1 memorized at the previous cycle. The inputs of the subtractor (or the output) are reversed at each cycle in a reversing switch SW to take account of what was stated further above on the alternating sign of the difference between the result signals SR1 and SR'1. The reversing switch is synchronized with the working of the shutter, the signal processing circuits all being furthermore also synchronized with the shutter. A possible shape of a mechanical shutter with three opaque sectors separated by three transparent sectors is symbolized in FIG. 4. It corresponds to two consecutive cycles for one turn of the shutter. It must be understood, however, that the shutter could have only one opaque zone and that then it is the electronics of the integrated circuit that define the current cycle. This is how it is done in any case if the shutter is electroptical and not mechanical.

It is possible, of course, to conceive of other architectures in which the SC is computed by subtraction at stages other than the final stage, provided that the subtraction is not done by distinct individual circuits for each pixel.

For example, in charge-transfer circuits, the differences can be established by subtraction of charge packets before the conversion of these charge packets into analog voltages. The subtraction could be done also after the conversion into analog voltages but before digitization.

In the case of a monolithic detector associated with charge-transfer circuits, preferably use will be made of the fact that the four measurements corresponding to a cycle can be stored in four adjacent compartments of a shift register. In this case, the third phase of each cycle is profitably used (since no measurements are made) to empty all the shift registers giving the measurements made during this cycle for all the pixels. The duration of the third phase may be adjusted as a function of the duration needed for the reading. It is not desirable that the duration of the third phase should be shorter than that of the active phases. It is preferable, if possible, that the third phase should have the same duration, for the evenness of the heating and cooling cycles on the pyroelectric layer.

Figure 5:
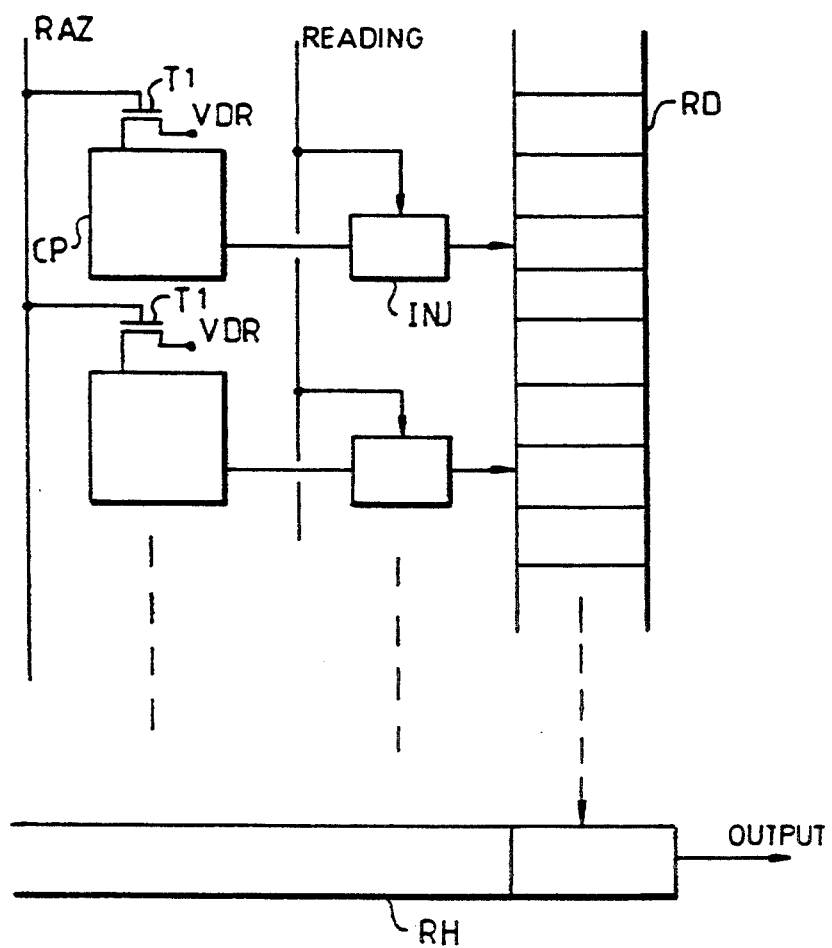
FIG. 5 shows the organization of the detector in the case of processing by charge-transfer devices.

FIG. 5 gives a schematic view of the organization of the shift register RD associated with a column of pyroelectric capacitors CP. The number of compartments of the register is four times greater than the number of capacitors. The lower plates of the capacitors are regularly reset to level by the transistors T1 connected to a source of reset-to-level voltage VDR. A charge injector, INJ, controlled by the potential of the pyroelectric capacitor, is activated simultaneously for all the capacitors. The injector injects a quantity of charges, into the register, that is proportional to the measurement signals VDE1, VFE1, etc. The register is shifted in synchronism with the different measurements, hence with the different instants of injection.

Thus, four injection operations succeed one another for each cycle: the injection of a signal representing VDE1, the shifting of a compartment of the register, the injection of a signal corresponding to VFE1, the resetting to level and shifting of a compartment of the register; the injection of VDM2; the shifting of a compartment; the injection of VFM2; resetting to level; then the gradual emptying of the column register during the third phase of the cycle (conventionally the last compartment of all the column registers gets emptied into a compartment of a horizontal register RH; the horizontal register is emptied very swiftly between two shifts of the column registers). For the second cycle, the operation takes place in the same way, the injected signals being successively: VDM1, VFM1, VDE2, VFE2.

Figure 6:
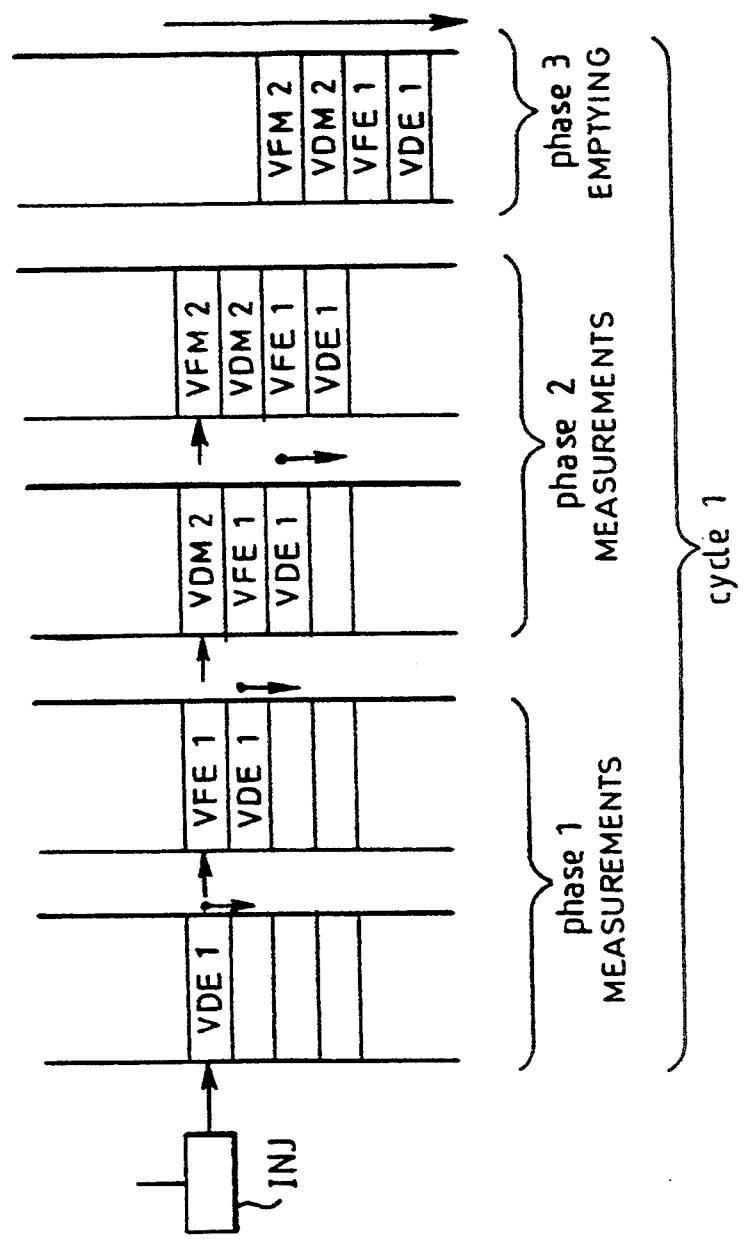
FIG. 6 shows a schematic view of the working of the shift register containing the instantaneous measurement signals.

FIG. 6 shows the successive changes undergone by the contents of the compartments of the register during the even-order cycle: the filling of two compartments by VDE1 and then VFE1 during the first phase, then of two other compartments by VDM2 and then VFM2 during the second phase and finally the emptying of the register during the third phase. Only the four compartments associated with a pyroelectric capacitor are represented: the other compartments correspond to the other capacitors of the same column, i.e. to other pixels of the same column.

What is claimed is:

1. A thermal image detector having a shutter for the alternate illuminating and masking of the detector, means for providing, cyclically, at least one signal for the measurement of a pixel illuminated during an illumination phase and at least one signal for the measurement of a pixel masked during a masking phase, and means for utilizing these measurement signals to produce, by different between the measurement signals produced during a cycle, a temperature signal representing a measurement of temperature of said pixel for said cycle, said thermal image detector comprising:

means for producing measurement signals during two successive cycles, each cycle comprising at least one masking phase and one illumination phase, an order to said masking and illumination phases being reversed between two consecutive cycles; and means for subtracting the signals produced during said first cycle from those produced during said second cycle.

2. A detector according to claim 1, wherein a first cycle comprises, firstly, a first active phase of illumination and then a second active phase of masking and then a third passive phase of illumination, wherein a second cycle comprises, firstly, a first active phase of masking, then a second active phase of illumination and then a third passive phase of masking, measurement signals being produced during active phases only.

3. A detector according to claim 2, wherein durations of all of said active phases are identical.

4. A detector according to claim 3, wherein durations of said passive phases are at least as long as those of said active phases.

5. A detector according to claim 3, wherein durations of said passive phases are identical to durations of said active phases.

6. A detector according to any of claims 2-5, further comprising: means for producing a first differential signal representing a thermal emission of a pixel during said first phase of said first cycle and a second differential signal during said second phase of said first cycle, and for producing a third differential signal and a fourth differential signal, respectively, during said first phase and said second phase of said second cycle; and means for producing two result signals which represent a difference between said first and second differential signals and a difference between said third and fourth differential signals, respectively; and means for producing a corrected signal which represents a difference between said two result signals.

7. A thermal detector according to claim 5, further comprising means for producing a measurement signal at the start of each active phase and a measurement signal at the end of each active phase; and means for producing differential signals representing a difference between said measurement signal at the end of an active phase and said measurement signal at the start of said active phase.

8. A detector according to any of claims 1-2, further comprising a switch for reversing, at each new cycle, a sign of a result of the subtraction between signals of, said first cycle and of said second cycle.

9. A detector according to any of claims 1-2, further comprising a memory for storing a signal produced during a cycle preceding a current cycle; and a subtractor for receiving a signal produced during said current cycle and the stored signal.

10. A thermal image detector according to any of claims 1-2, wherein said detector is a pyroelectric detector comprising a network of pyroelectric capacitors, a charge of each capacitor being a function of a temperature of the capacitor.

11. A detector according to claim 10, wherein said capacitors are connected to a charge-transfer device comprising a shift register associated with a column of pyroelectric capacitors, each capacitor being associated with four consecutive compartments of said shift register, with means for injecting, into a first compartment of said four compartments, a charge as a function of the pyroelectric capacitor, and means for shifting the register, firstly after the start and, secondly, after the end of each of the two first phases of each cycle.

12. A detector according to claim 11, wherein each pyroelectric capacitor is connected to an electrode of said charge-transfer device, to set up a variable level potential barrier as a function of a temperature of the capacitor.

* * * * *